United States Patent
Tanimoto et al.

(10) Patent No.: US 6,938,968 B2
(45) Date of Patent: Sep. 6, 2005

(54) VACUUM INSULATING MATERIAL AND DEVICE USING THE SAME

(75) Inventors: Yasuaki Tanimoto, Hyogo (JP); Tomohisa Tenra, Osaka (JP); Masayuki Nakanishi, Osaka (JP); Akiko Yuasa, Kyoto (JP)

(73) Assignee: Matsushita Refrigeration Company, Shiga (JP)

( * ) Notice: Subject to any disclaimer, the term of this patent is extended or adjusted under 35 U.S.C. 154(b) by 161 days.

(21) Appl. No.: 10/258,131

(22) PCT Filed: Apr. 23, 2001

(86) PCT No.: PCT/JP01/03469

§ 371 (c)(1),
(2), (4) Date: Mar. 17, 2003

(87) PCT Pub. No.: WO01/81817

PCT Pub. Date: Nov. 1, 2001

(65) Prior Publication Data

US 2003/0157284 A1 Aug. 21, 2003

(30) Foreign Application Priority Data

Apr. 21, 2000 (JP) .................................... 2000-120794
May 25, 2000 (JP) .................................... 2000-154216
Sep. 6, 2000 (JP) .................................... 2000-269854

(51) Int. Cl.⁷ .............................. B32B 1/06; F25D 11/00
(52) U.S. Cl. ................................ 312/406; 428/69
(58) Field of Search ......................... 428/69, 76, 401; 312/400, 401, 406; 220/592.02, 592.26, 592.09, 592.2; 52/406.2, 406.3, 406.1

(56) References Cited

U.S. PATENT DOCUMENTS

| | | | | |
|---|---|---|---|---|
| 2,779,066 A | * | 1/1957 | Gaugler et al. ............... 312/406 |
| 4,005,919 A | * | 2/1977 | Hoge et al. .................. 312/406 |
| 4,323,620 A | * | 4/1982 | Iwabuchi et al. ............. 428/215 |
| 4,486,482 A | * | 12/1984 | Kobayashi et al. ............ 428/69 |
| RE32,258 E | * | 10/1986 | Kondo et al. ................. 29/890 |
| 4,615,988 A | * | 10/1986 | Le Moigne et al. ........... 501/30 |
| 4,747,513 A | * | 5/1988 | Betille et al. ............. 220/560.12 |
| 5,082,335 A | * | 1/1992 | Cur et al. .................... 312/401 |
| 5,250,488 A | * | 10/1993 | Thelohan et al. ............. 501/36 |
| 5,332,699 A | * | 7/1994 | Olds et al. ................... 501/36 |
| 5,532,034 A | | 7/1996 | Kirby et al. |
| 5,669,232 A | * | 9/1997 | Iwamoto et al. .............. 62/296 |
| 5,693,399 A | * | 12/1997 | Himeshima et al. .......... 428/69 |
| 5,730,516 A | * | 3/1998 | Vismara ...................... 312/406 |
| 5,866,228 A | * | 2/1999 | Awata ......................... 428/69 |
| 5,943,876 A | * | 8/1999 | Meyer et al. ................ 62/371 |
| 6,128,914 A | * | 10/2000 | Tamaoki et al. .............. 62/440 |
| 6,266,941 B1 | * | 7/2001 | Nishimoto ................. 52/788.1 |
| 6,818,575 B2 | * | 11/2004 | Wallenberger ............... 501/35 |
| 2003/0134078 A1 | * | 7/2003 | Urata et al. .................. 428/69 |

FOREIGN PATENT DOCUMENTS

| | | |
|---|---|---|
| EP | 0 036 238 | 9/1981 |
| JP | 30-3139 | 5/1955 |
| JP | 57-173689 | 10/1982 |

(Continued)

Primary Examiner—Janet M. Wilkens
(74) Attorney, Agent, or Firm—Wenderoth, Lind & Ponack, L.L.P.

(57) ABSTRACT

Vacuum heat insulator comprising a laminated core made of a plurality of sheets of inorganic fibers having 10 μm or smaller in diameter and a certain composition including $SiO_2$ as a main component, $Al_2O_3$, CaO, and MgO, a gas barrier enveloping member, and an absorbent. The vacuum heat insulator is characterized by having at least one groove formed therein after fabrication of the vacuum heat insulator. Further, the vacuum heat insulator is characterized by using inorganic fiber core of which a peak of distribution in fiber diameter lies between 1 μm or smaller and 0.1 μm or larger, and not containing binding material for binding the fiber material. Electronic apparatuses use the vacuum heat insulator. With use of the vacuum heat insulator, electronic and electric apparatuses superior in energy saving and not to present uncomfortable feeling to the user can be provided.

24 Claims, 10 Drawing Sheets

FOREIGN PATENT DOCUMENTS

| | | |
|---|---|---|
| JP | 60-208226 | 10/1985 |
| JP | 61-144492 | 7/1986 |
| JP | 62-69503 | 5/1987 |
| JP | 63-35865 | 2/1988 |
| JP | 5-502431 | 4/1993 |
| JP | 5-508600 | 9/1994 |
| JP | 7-139691 | 5/1995 |
| JP | 7-167376 | 7/1995 |
| JP | 8-503255 | 4/1996 |
| JP | 8-192487 | 7/1996 |
| JP | 9-138058 | 5/1997 |
| JP | 9-145239 | 6/1997 |
| JP | 9-269186 | * 10/1997 |
| JP | 9-303676 | * 11/1997 |
| JP | 10-299982 | 11/1998 |
| JP | 11-189456 | 7/1999 |
| JP | 11-281245 | * 10/1999 |
| JP | 2000-97390 | 4/2000 |
| JP | 2001-295984 | * 10/2001 |
| JP | 2004-99060 | * 4/2004 |
| WO | 92/04301 | 3/1992 |

* cited by examiner

VACUUM INSULATING MATERIAL AND DEVICE USING THE SAME

TECHNICAL FIELD

The present invention relates to vacuum heat insulator useful as insulating material for electric home appliances, and apparatuses employing this vacuum heat insulator such as refrigerators, hot/cold reserving boxes, water heaters, vending machines, notebook-type computers, and the like.

BACKGROUND OF THE INVENTION

It has become an important work in recent years to make positive actions against protection of the earth environment. Since energy saving is an urgent demand for electric home appliances, it is an important task to improve efficiency of heat insulation for the products such as refrigerators and hot/cold preserving boxes. In addition, high performance of insulating material also becomes inevitable for a variety of other home appliances and electronic apparatuses in order to facilitate energy saving.

Furthermore, as a recently occurring problem in notebook computers, heat generated within a computer is transferred to a surface of the device enclosure, and the heat of the enclosure surface in contact with a user's body for a long time gives an uncomfortable feeling to the user when the surface temperature rises. Insulating material having good insulating property is also desired in this instance.

Vacuum heat insulator is available as means to address the problems of the above kind. Japanese Patent Laid-Open Publications, Nos. S57-173689 and S61-144492, for example, disclose vacuum heat insulators that use inorganic powder. They describe methods of obtaining vacuum heat insulator by filling a plastic film envelope with inorganic powder having a particle diameter of 1 $\mu$m or smaller, and hermetically sealing it after an evacuation of its interior.

However, the above prior art technique has problems such as impairment of work environment due to powdery dust and complication of the manufacturing process, because of its use of fine powder.

In addition, Japanese Patent Laid-Open Publication, No. 2000-97390 discloses a method of providing vacuum heat insulator with flexibility to reduce leakage of heat from a sealing area of the vacuum heat insulator.

However, in order to provide flexibility to the vacuum heat insulator with the prior art technique, it is necessary that a core retain its shape after it is compression-formed. The prior art technique has not been employed, however, if the core does not maintain its own shape. In particular, when a sheet-formed material consisting of inorganic fibers is used as the core, the prior art technique has not been effective to provide the required flexibility since the inorganic fibers are broken by the pressure and the core disintegrates in the compression forming process.

Numerous attempts have been done to address these problems, and vacuum heat insulators using fibrous material in particular have been proposed.

According to Japanese Patent Laid-Open Publication, No. S30-3139, for instance, a kind of vacuum heat insulator is proposed, in that glass fibers having fiber diameter of 250 $\mu$m or smaller are used as a core, and its interior kept in vacuum of 0.75 Pa or less. Also, Japanese Patent Laid-Open Publication, No. S60-208226 describes a technique of using fibers as a core of the vacuum heat insulator, in which thin inorganic fibers are laminated randomly in a direction orthogonal to a direction of heat transfer, and binding fibers are sewn in up to halfway.

Furthermore, Japanese Patent Laid-Open Publication, No. H9-138058 discloses a method of fixing fibers with a binder, as another known example. This method is to form fibrous material such as glass wool using an organic binder, for use as a core of the vacuum heat insulator.

However, these techniques of the prior art were difficult to adapt for practical use, as they have the following problems. With the technical specifications of the Japanese Patent Examined Publication, No. S30-3139, for instance, it is difficult to form the heat insulator into a consistent shape because it is composed solely of glass fiber. In a case of fabricating a plate-form vacuum heat insulator, it raises a problem requiring an extra man-hour when using the glass fibers as a core of the vacuum heat insulator, since the glass fibers themselves are not capable of retaining its own shape.

Moreover, according to the technical specifications of the Japanese Patent Laid-Open Publication, No. S60-208226, although the fibers themselves are provided with an ability of retaining their own shape because of the sewn up fibers, there is a problem of high production cost since the conventional method is not employed to sew up the fibers while maintaining a reduced solid thermal conduction.

Furthermore, according to the technical description of the Japanese Patent Laid-Open Publication H9-138058, there is proposed a technique of fixing fibrous material with organic binder as the method of providing the fibrous material with shape retaining capability. However, though it specifies a kind of binder, it does not teach details of filling amount, material composition of the fibers used and so on. Therefore, it still has a problem leaving difficulty of fixing the fibers with binder while maintaining the insulating property necessary to use as a vacuum heat insulator.

Japanese Patent Laid-Open Publications, Nos. H07-167376 and H07-139691, for example, disclose high performance vacuum heat insulators. The Publication, No. H07-167376 teaches a technique to obtain vacuum heat insulator using a core composed of inorganic fibers having an average fiber diameter of 2 $\mu$m or smaller, and more desirably 1 $\mu$m or smaller, which are treated in an acid solution followed by a compression dehydration, so as to concentrate an eluted component of the inorganic fibers at intersecting points of the fibers, and make the component as binding material to bind the fibers. The Publication, No. H07-139691 teaches a technique to obtain vacuum heat insulator using inorganic fibers having an average fiber diameter of 2 $\mu$m or smaller, and more desirably 1 $\mu$m or smaller, in which a plurality of sheets of paper obtained from the inorganic fibers by acid paper-making process are laminated under acidic atmosphere, followed by a compression process, and the fibers are then bound at individual intersecting points with a component eluted from the inorganic fibers.

In addition, there has been proposed vacuum heat insulator having flexibility, which primarily uses fibrous material. In Japanese Patent Laid-Open Publication, No. H05-502431 for instance, there is disclosed vacuum heat insulator which contains inorganic fiber material of 1 $\mu$m or larger, but 25 $\mu$m or smaller in fiber diameter as a core, and characterized by not containing binding material. It discloses such an advantage as excellent reliability because of no degradation in heat insulation property in long term use since it contains no binding material that generate gaseous product under the vacuum condition within an enveloping member, in addition to the superiority in flexibility.

However, these techniques of the prior art have the following problems. According to the technical specifications disclosed in the Laid-Open Publications, Nos. H07-167376 and H07-139691, for instance, the vacuum heat insulators lack flexibility, and are not formed in shapes such as bent, curved, and cylindrically formed, because they use as cores the composition produced by concentrating eluted component of the inorganic fibers at intersecting points of the fibers, rendering it to act as binding material for binding the fibers, and subjecting the fibers to the compression process.

Furthermore, the technical specifications of the Laid-Open Publication, No. H05-502431 provides the vacuum heat insulator, which is adaptable to alteration in shape and superior in reliability. However, it is not satisfactory because it only has a heat insulation property of approximately three times that of the ordinary rigid urethane foam of the prior art, since it uses the fibers having diameters larger than 1 $\mu$m.

As described above, the problems common to the techniques of the prior art are the cost and performance, especially in respect of a difficulty in realizing compatibility between heat insulation property and flexibility, and thereby they are not adaptable for practical use.

The present invention is to provide vacuum heat insulator, which is practical for use while also realizing low-cost, by defining physical properties and characteristics of fiber material used for the vacuum heat insulator, as well as a kind of binder and specific filling amount of the binder when used. The invention also provides electronic apparatuses that use the vacuum heat insulator.

DISCLOSURE OF THE INVENTION

Vacuum heat insulator of the present invention comprises: a core made of a lamination of a plurality of sheets composed of inorganic fibers having 10 $\mu$m or smaller in diameter and a composition including $SiO_2$, as a main component, together with $Al_2O_3$, CaO, and MgO; an enveloping member having gas barrier property; and an absorbent. The vacuum heat insulator is characterized in laminating a plurality of sheets having cut-off portions formed therein, except for the uppermost sheet and the lowermost sheet, and an absorbent in the cut-off portion.

Further, the vacuum heat insulator of the present invention is characterized in having at least one groove formed in it, after fabricated as above.

Furthermore, the vacuum heat insulator of the present invention is characterized in use of an inorganic fiber core of which a peak of distribution chart in fiber diameter lies specifically between 1 $\mu$m or smaller and 0.1 $\mu$m or larger, and not containing binding material for binding the fiber material.

In addition, apparatuses of the present invention use the above-described vacuum heat insulator of this invention.

THE BEST MODES FOR CARRYING OUT THE INVENTION

Exemplary embodiments of the present invention will be described hereinafter with reference to accompanying drawings.

First Exemplary Embodiment

Figure 1:
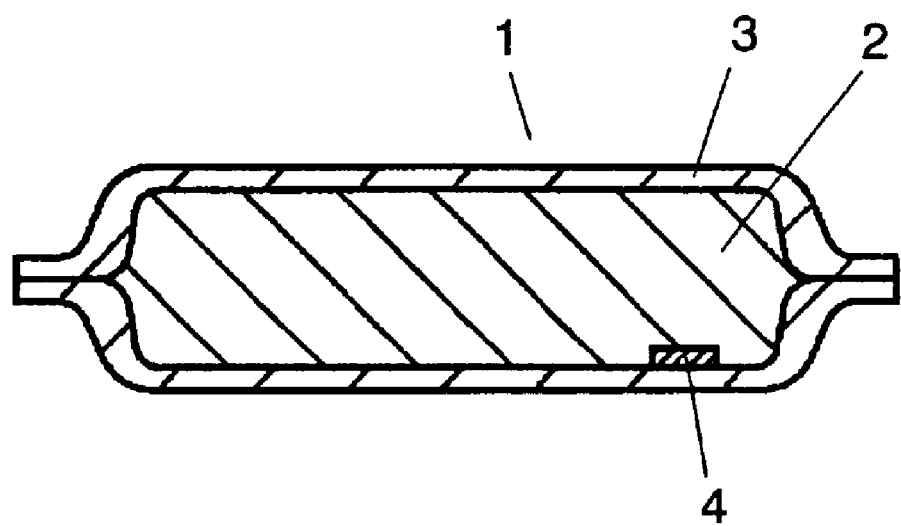
FIG. 1 is a schematic drawing showing a section of a vacuum heat insulator of an exemplary embodiment of the present invention.

FIG. 1 shows a sectional view of a vacuum heat insulator in an exemplary embodiment of the present invention, wherein the vacuum heat insulator 1 comprises a core 2, an enveloping member 3, and an absorbent 4.

The enveloping member 3 comprises two kinds of laminated films.

One of the laminated films covering one face of the vacuum heat insulator has a four-layer structure comprising polyamide film (16 $\mu$m), aluminum foil (6 $\mu$m), polyethylene terephthalate film (12 $\mu$m), and high density polyethylene film (50 $\mu$m). The polyamide film constitutes an outermost layer acting as a surface protective layer, and the high-density polyethylene layer is for a purpose of heat seal.

Another face consists of a laminated film comprising four layers, i.e. polyamide film (16 $\mu$m) as a surface protective layer, a film of ethylene-vinyl alcohol copolymer resin composite (15 $\mu$m) with an aluminum layer deposited on its inner surface, polyethylene terephthalate film (12 $\mu$m), and high density polyethylene film (50 $\mu$m). The high-density polyethylene layer is for heat seal.

The vacuum heat insulator 1 of the foregoing structure can suppress a leakage of heat through the aluminum foil as well as a permeation of gases through the deposited film, since the enveloping member 3 is composed of the laminated film provided with the aluminum foil on one of the faces and another laminated film deposited with aluminum on the other face. That is, it can suppress both of the degradation in heat insulation property due to the increase of heat leakage and also the degradation in the heat insulation property during a long time of use due to the permeation of gases.

However, the enveloping member 3 needs not be limited to above-described structure. In consideration of a cost reduction of the enveloping member and a use in a high temperature environment or the like, it may be desirable to use a laminated film provided with crystalline polypropylene film (50 $\mu$m) as the heat seal layer in place of polyethylene.

Furthermore, a cost reduction can be obtained by eliminating the outermost layer of polyamide, when a thickness of the polyethylene terephthalate film is slightly increased to replace the polyamide. A reduction in resistance to bending due to the elimination of polyamide can be compensated with the increase in thickness of the polyethylene terephthalate film.

In addition, a composition of the enveloping member needs to be selected properly among a variety of materials according to an environment it is used. High-density polyethylene and the like are suitable as a material for the heat seal layer when used in a relatively low temperature such as for refrigerators, cool boxes or the like. On the other hand, crystalline polypropylene, ethylene-vinyl alcohol copolymer resin, or polyethylene terephthalate resin, polyethylene naphthalate resin, and the like are suitable for the heat seal layer, in the case of water heaters or the like, that operate in a comparatively high temperature range.

Also, the enveloping member may be composed of laminate films of one kind instead of using the laminate films of two different kinds. If this is the case, a sealing configuration of the enveloping member 3 is not limited to a three-sided seal, but an envelope of such configurations as a gusset bag type, a pillow case type, and the like may be usable. This can reduce protrusions around the fringe of the enveloping member 3, thereby eliminating a process of folding the protrusions.

The absorbent 4 is disposed in an cut-off portion provided in the inorganic fiber sheets of the core 2, except for the uppermost sheet and the lowermost sheet. Therefore, this obviates a problem that the absorbent 4 may form a protrusion to break the enveloping member 3 when the vacuum heat insulator is fabricated.

The "Combo Getter" supplied by SAES Getters S.p.A is excellent as a material for the absorbent 4. It removes oxygen and nitrogen as well as moisture and carbon dioxide by absorption, thereby avoiding degradation of vacuum level within the vacuum heat insulator 1 for a long period of time.

Besides, there are other materials also acceptable for this purpose, including activated carbon, zeolite, dawsonite, hydrotalcite, metallic hydroxides such as magnesium hydroxide and calcium hydroxide, metallic oxides such as calcium oxide, moisture absorbents such as magnesium chloride, lithium chloride, and calcium chloride, and the "Ageless" made by Mitsubishi Gas Chemical Co., Inc. A material consisting of calcium hydroxide may also be useful as absorbent of carbon dioxide. Effectiveness of the absorbent can be improved further when these materials are used in combination with the above "Combo Getter" made by SAES Getters S.p.A, thereby maintaining the vacuum heat insulation property for a long period of time.

The core 2 is constructed by laminating two or more sheets of sheet-formed inorganic fibers. Therefore, it produces a swirling flow of gases because there is a difference in fluid resistance between surfaces and interiors of the sheets, and this yields a sort of pumping function during vacuum evacuation to substantially improve productivity of the vacuum heat insulator.

Although a number of the sheets to be laminated is not specifically limited, it is desirable to use three or more of them, taking into consideration of preventing the absorbent 4 from forming a protrusion. In consideration of further improvement of the productivity including physical strength and so forth of the laminated sheet, it is even more desirable to use four or more sheets.

Inorganic fibers are used as material of the core 2, whose composition includes 50–65 wt % of $SiO_2$, 10–20 wt % each of $Al_2O_3$ and CaO, and 1–4 wt % of MgO.

The reason of using $SiO_2$ as the main ingredient is that this material is low in thermal conductivity and not expensive. In order to apply the inorganic fiber to the vacuum heat insulator, a composition range of $SiO_2$ is desirably 50–65 wt %, and 55–60 wt % is even more desirable.

$Al_2O_3$ is included to improve heat resistance of the core 2, but the less the content of it, the more desirable when taking into account the thermal conductivity of $Al_2O_3$. A content of $Al_2O_3$ is preferably 10–20 wt % in the inorganic fibers, when consideration is given to a balance between the heat resistance and the heat insulation property. The heat resistance decreases if the content is less than 10 wt %, and the heat insulation property of the vacuum heat insulator is impaired if the content is more than 20 wt %.

CaO has a function of absorbing moisture in the vacuum heat insulator, and the content of 10–20 wt % provides the inorganic fibers with an excellent heat insulation property. This effect does not change so much even if the content is increased beyond 20 wt %, and the effect of improvement of the property of the vacuum heat insulator by moisture adsorption becomes unappreciable if the content is reduced to less than 10 wt %.

Addition of MgO is effective to increase cohesion of the fiber, and therefore effective to improve shape retaining property of the sheets. This effect is more appreciable especially when the fiber sheets are fabricated with the paper-making process and the like. The improvement of cohesion is apparent with 1–4 wt % content of MgO, but this effect remains unchanged even if the content is increased beyond 4 wt %. Also, the cohesion decreases if the content is decreased below 1 wt %. Therefore, it can be said that 1–4 wt % content of MgO is preferable.

Although material composition of the fibers used for the core 2 is described above, it is also necessary to define its best physical properties since fiber diameter and bulk density also have their influences on the heat insulation property of the vacuum heat insulator 1.

In regard to fiber diameter of the core 1, 1 to 3 $\mu$m is desirable. It becomes difficult to produce the fibers at industrially economical cost if the fiber diameter is smaller than 1 $\mu$m, since it causes a substantial increase in number of man-hours for processing, and requires a special equipment to produce the fibers. Moreover, it increases a gaseous thermal conductivity and impairs the heat insulation property, because the fibers themselves get heavily tangled with one another to form large coherent bodies, thereby resulting in formation of large pores.

However, the heat insulation property of the heat insulator can be improved even if the fiber diameter of the inorganic fibers is thinner than 1 $\mu$m, when used in other conditions of the present invention as described in the following another exemplary embodiments of this invention.

Further, if the fiber diameter is larger than 3 $\mu$m, the heat insulation property declines because large pores are formed by cohesion of the fibers, which increase a contribution factor of the gaseous heat conductivity. In order to compensate this problem, it becomes necessary to produce vacuum of approx. 0.13 Pa, and this makes it difficult to industrially and efficiently produce the heat insulators, since the industrially and efficiently producible ordinary vacuum of approx. 13 Pa is not useful.

Therefore, the inorganic fibers having a fiber diameter of 3 $\mu$m or smaller are suitable to use for the vacuum heat insulator, when considering the industrial productivity. Fiber diameter of 2 to 3 $\mu$m has shown a preferable result under the conditions of this exemplary embodiment.

On the other hand, an adverse effect can result in the heat insulation property of the vacuum heat insulator, even with the material of such a fiber diameter, if a bulk density of the fibers is not appropriate. The heat insulation property of the vacuum heat insulator declines, if bulk density of the fibers becomes higher than 300 kg/m$^3$ because an influence of solid thermal conduction of the fibers themselves increases. In addition, the flexibility provided by use of the fiber material is also impaired, and thereby it becomes unsuitable for the apparatuses having irregular portions, which are the feature of this invention.

Furthermore, the heat insulation property of the vacuum heat insulator declines, if the bulk density of the fibers becomes lower than 100 kg/m$^3$, because air gaps increase as a proportion of space occupied by the fibers in a given space decreases, resulting in an increase of gaseous thermal conduction. In addition to the above, there is also a problem that makes it difficult to fabricate vacuum heat insulators having a stable shape, because a degree of deformation increases due to atmospheric compression when evacuated.

According to the above result, 100 kg/m$^3$ or higher, but 300 kg/m$^3$ or lower is suitable as a bulk density of the fiber material used for the vacuum heat insulator, and 100 kg/m$^3$ or higher and 200 kg/m$^3$ or lower is even more desirable.

It is preferable to fix fibers with binder to form the fibers into a sheet-like shape. However, if the kind of binder used or the filling amount is not appropriate, it impinges on the heat insulation property of the vacuum heat insulator.

Inorganic material, for instance, increases density of the sheet in its entirety, if used as the binder. Even with an organic binder, a thermosetting resin such as phenolic resin has an adverse effect on the heat insulation property, because a level of vacuum is degraded by unreacted monomers that gasify in the vacuum atmosphere.

When thermoplastic is used as the binder, on the other hand, the above adverse effect of unreacted monomers can be eliminated. In a case the sheet is fabricated with the paper-making process, it is desirable to use water-soluble polymer in view of the environmental protection, and that water-soluble acrylic resin is good example in this respect.

If water-soluble acrylic resin is used, it can be distributed uniformly throughout the entire sheet even if the sheet is fabricated with the paper-making process, and thereby realizing the sheet provided with an uniform binding strength.

On the other hand, even when water-soluble acrylic resin is used as the binder, an adding amount is important. If the adding amount is less than 3 wt %, though sheet-like fibers can be formed, the sheet may break when being wound into a roll, which makes it difficult to maintain stable fabrication. Or, if the adding amount is more than 10 wt %, the viscosity of slurry increases in fabrication with the paper-making process, thereby lowering the productivity. In addition, properties of the vacuum heat insulator degrade because of an increase in the solid thermal conduction.

For the above reasons, 3 wt % or more, but 5 wt % or less is suitable as a adding amount of the acrylic binder, and 3 to 4 wt % is more desirable.

However, vacuum heat insulator of good heat insulation property can be obtained without using binder, provided that productivity of the sheet is not regarded as a problem.

According to the foregoing composition, a plurality of sheets are laminated to form the core 2. The core 2, after being dried for one hour at 130° C. in a drying oven, is inserted into the enveloping member 3 with the absorbent 4, and, then, the vacuum heat insulator 1 is fabricated by a vacuum evacuation followed by a hermetic sealing.

The vacuum heat insulator obtained as described above was measured for a heat insulation property at an average temperature of 24° C. with the "Auto-λ" made by Eiko Instruments Trading Co., Ltd. The result showed that the vacuum heat insulator 1 has a thermal conductivity of 0.0035 to 0.0038 W/mK at the average temperature of 24° C., which represents superior heat insulation property by about two times as compared to the conventional vacuum heat insulators that use silica powder or open-cell polyurethane foam.

Second Exemplary Embodiment

Figure 2:
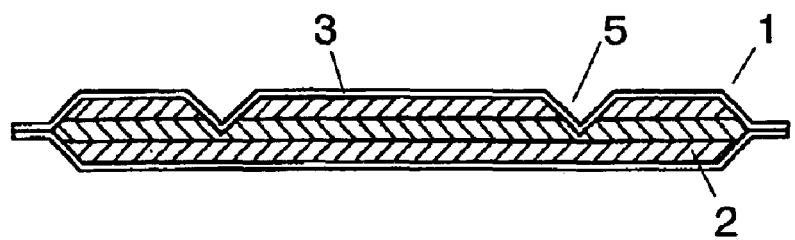
FIG. 2 is a schematic drawing showing a section of a vacuum heat insulator of another exemplary embodiment of the present invention.
Figure 3:
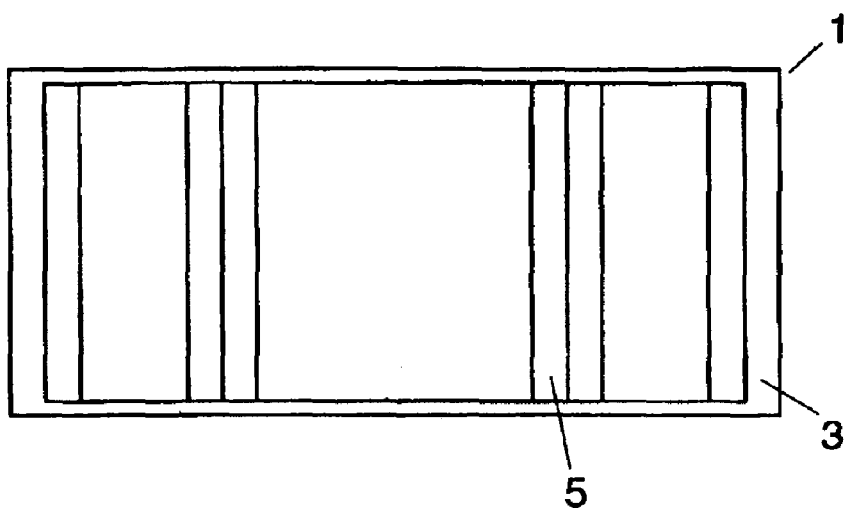
FIG. 3 is a plan view showing the vacuum heat insulator of the same exemplary embodiment of the invention.

FIG. 2 is a sectional view of a vacuum heat insulator of the present exemplary embodiment. FIG. 3 is a plan view of the vacuum heat insulator of this exemplary embodiment. In the vacuum heat insulator 1 of the exemplary embodiment, a groove 5 is formed by compression forming.

A method of fabricating the vacuum heat insulator 1 will be described next.

In this exemplary embodiment, glass fibers made of silicate glass as a main component and having amorphous structure with an average fiber diameter of 1 to 5 μm is processed into a sheet form at a thickness of 5 mm, for use as a core 2. The core 2 is then constructed by laminating three sheets of the above glass fibers. The vacuum heat insulator 1 is formed by inserting the core into a bag-shaped enveloping member made of a film having a gas barrier property, after the core is drying for one hour at 130° C., evacuating its interior, and hermetically closing its opening by a heat seal.

Following the above process, the vacuum heat insulator is subjected to compression forming with a hydraulic press provided with an embossing die to form a groove in it as shown in FIGS. 2 and 3.

In this exemplary embodiment, a shape of the core can be altered easily, since the compression forming is made on the core only after the evacuation and hermetic sealing processes. In other words, the shape of the core can be altered easily, even when a sheet-form material made of inorganic fibers is used as the core, which is usually unable to retain its original shape because the fibers are cut by the compression. For this reason, the thickness of the core of the vacuum heat insulator is thinner in the groove formed by the compression forming as compared to the other areas around it, and a tension of the gas barrier film decreases. Furthermore, bending of the vacuum heat insulator 1 can be made easily even when it is bent in a manner that a grooved face locates an inside, since a space in the groove can prevent two sides of the core from interfering with each other when being bent.

Also, a direction of the bending does not make any problem in either of the cases that the grooved face is bent inside or outside.

Accordingly, it greatly improves a degree of freedom in shape of the vacuum heat insulator and, as a result, it substantially increases portions and kinds of apparatuses for which this vacuum heat insulator can be used.

In this case, the bending process of the vacuum heat insulator was carried out easily without being interfered by the core during the process, when a thickness of the core in the groove was one-half or smaller than that of the other areas. It was difficult, however, when the thickness was larger than one-half. It was found that when the thickness of the core in the groove is thinner, the bending process is more preferably and easily processed.

Furthermore, although the groove can be designed freely into any shape according to the desired bending angle, it is preferable to choose such shapes that a extra stress is not applied on the gas barrier film during the compression forming and that groove is shaped not to cause an interference of the core when the vacuum heat insulator of a plate shape is being bent.

The materials for the vacuum heat insulator will be described next.

The core 2 is comprised of glass fibers made of an amorphous silicate glass as a main component with an average fiber diameter of 1 to 5 μm, which is processed into a sheet-like form having a thickness of 5 mm. Three sheets of the sheet-like glass fiber are laminated to form the core. The fiber diameter was calculated based on a SEM image. A bulk density of the core was 100 to 200 kg/cm$^3$, in this embodiment. The fabrication can be carried out without a problem in productivity so long as a number of sheets to be laminated is two or more. A desired thickness of the core can be obtained by selecting a combination of a variety of sheets having different thickness.

The enveloping member 3 consists of a laminate film at one of the faces, which comprises polyethylene terephthalate (12 μm) serving as a surface layer, aluminum foil (6 μm) as a middle layer, and high-density polyethylene (50 μm) for an innermost layer, and another laminate film at the other face, which comprises polyethylene terephthalate (12 μm) as a surface layer, a metal-deposited film of ethylene-vinyl alcohol copolymerized resin composite (15 μm) (brand name of "Eval" made by Kuraray Co., Ltd.) with aluminum deposited on an interior side as a middle layer, and high-density polyethylene (50 μm) as an innermost layer.

Among the structural features of the enveloping member, the outermost layers are for protection from impact and to provide for rigidity, the middle layers are to retain gas barrier property, and the innermost layers are to hold function of sealing up by fusion welding (heat seal) of the films.

Therefore, any of the generally known materials is suitable to use so long as it fulfills these purposes. It is possible, for example, to improve a resistance to piercing force by laminating polyamide resin or the like on the outermost layer in the same manner as that of the first exemplary embodiment, or to provide two layers of aluminum-deposited film as the middle layer to improve gas barrier property, or to use laminate film provided with aluminum foil as the middle layer of both sides. Generally, high density polyethylene is desirable for the innermost layer subject to fusion welding, in view of the heat sealing property, gas barrier property, resistance to chemical attack, its cost, and so on. However, other materials such as polypropylene, polyacrylonitrile, and the like may also be useful depending on the specific application of the vacuum heat insulator.

Component material constituting the sheet-formed inorganic fiber is not specifically restrictive, but any kind of inorganic fibers including glass wool, ceramic fibers, rock fibers and the like may be used without problems so long as they meet all of the prescribed physical properties such as the average fiber diameter, bulk density, and so on. Moreover, it is not limited to a single component material, and organic or inorganic binder may be used to form the sheet-like configuration.

In addition, use of gas absorbent is effective for improvement of the heat insulation property when incorporated together as in the case of the first exemplary embodiment.

Moreover, the sheet-like configuration of the inorganic fibers can provide flexibility most effectively and easily without impinging on the productivity or the heat insulation property, as in the case of the first exemplary embodiment 1.

Third Exemplary Embodiment

Figure 4:
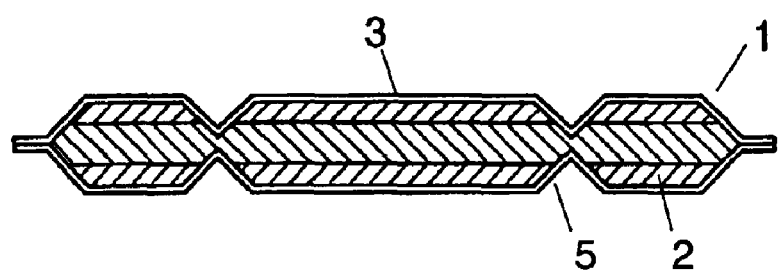
FIG. 4 is a schematic drawing showing a section of a vacuum heat insulator of still another exemplary embodiment of the present invention.

FIG. 4 is a schematic sectional view of a vacuum heat insulator of the present exemplary embodiment.

A method of fabricating the vacuum heat insulator 1, its constituent materials, and formation of a groove 5 are similar to what has been described in the second exemplary embodiment.

According to a structure shown in FIG. 4, the vacuum heat insulator is made to be easily bendable, since grooves associated with core of a small thickness can be formed in the vacuum heat insulator without causing damages to a film serving as an enveloping member with gas barrier property, even when the vacuum heat insulator has a large thickness.

In other words, when the grooves are formed in corresponding positions on front and back faces of the vacuum heat insulator, the bending process along the grooves is made easier, while also reducing substantially the damages to the enveloping member during the bending process. Even after it was subjected to a plurality of bending operations, no traces of pinholes, cracks, and the like were observed in the enveloping member.

Fourth Exemplary Embodiment

Figure 5:
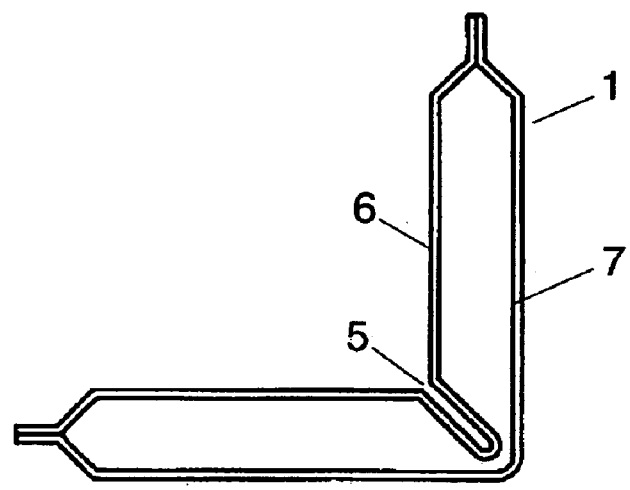
FIG. 5 is a schematic drawing showing a section of a vacuum heat insulator of yet another exemplary embodiment of the present invention.
Figure 6:
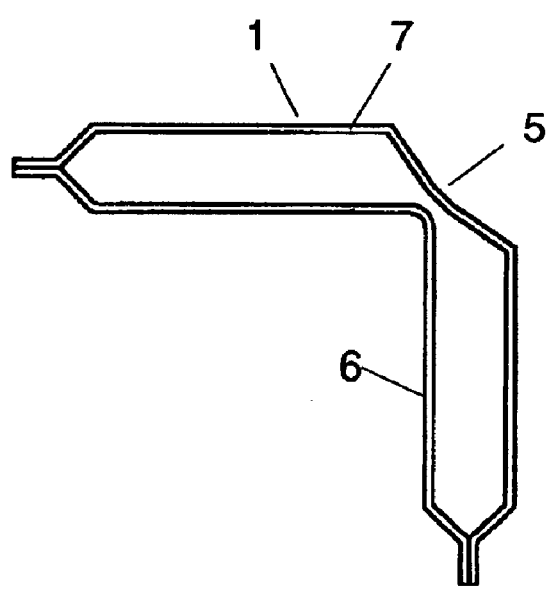
FIG. 6 is another schematic drawing showing a section of the vacuum heat insulator of the same exemplary embodiment of the present invention.

FIG. 5 and FIG. 6 are schematic sectional views of a vacuum heat insulator of the present exemplary embodiment as it is bent. The vacuum heat insulator 1 comprises a core and an enveloping member consisting of a film with gas barrier property. A configuration of the vacuum heat insulator, a method of fabricating it, and formation of a groove 5 are similar to what has been described in the second exemplary embodiment.

Each of FIGS. 5 and 6 depicts the vacuum heat insulator, as it has been subjected to a bending process for approx. 90 degrees along the groove formed therein. The bending is made with a face with groove 5 toward an inside in FIG. 5, and with the face with groove 5 toward an outside in FIG. 6.

A tension of the film having a gas barrier property becomes small in the groove formed by the compression-forming following the evacuation and sealing, since the thickness of the vacuum heat insulator in the grooved area is smaller as compared to other areas. This is why the vacuum heat insulator becomes easily bendable.

Moreover, when a thickness of the core in the grooved area is one-half or smaller that of the other areas, the process of bending the vacuum heat insulator can be carried out easily without using any special tools. The bending was quite difficult when the thickness of the core exceeded the one-half. The thinner the thickness of the core, the more preferable it is, since the bending process can be made easier. In addition, it was found that damages to the enveloping member during the bending process was reduced even when it was subjected to a plurality of bending operations.

It was also found that the gas barrier property of the enveloping member was improved further when it was bent in a manner that one face of the enveloping member bearing a deposited film 7 faces the outside, since no pinhole, crack, or the like occurred in the enveloping member even after a plurality of bending operations. This is because the deposited film, which receives less damages by elongation is facing the outside where the elongation is greater by the bending.

On the other hand, it was found that pinholes and cracks occurred in the aluminum foil after conducting a plurality of bending operations, when the enveloping member was bent in a manner that another film 6 surface bearing the aluminum foil positioned toward the outside. According to these results, it is preferable to make an arrangement so that the film surface of the aluminum foil does not face to the outside during the bending process.

However, the bending process of the vacuum heat insulator can be done without making pinholes or cracks in the aluminum foil or causing any other troubles even when it is bent in a manner that the film surface of the aluminum foil faces to the outside, or when the enveloping member being bent bears a laminated aluminum foil on both faces, when it is not subjected to a plurality of bending processes.

In an arrangement of the heat insulator, there may be an occasion in which one face carrying the aluminum foil is distinguished from the other face carrying the aluminum-deposited film according to a direction of heat transfer. However, the above pinholes and cracks in the aluminum foil does not become a fatal defect because there are seldom cases in general that the heat insulator is removed or replaced once it is mounted in a place.

As described, the vacuum heat insulator provided with the bending process was found to have no trouble such as degradation of the gas barrier property, spring back of the enveloping member, and the like, and is superior in bending accuracy and heat insulation property over an extended period of time. Accordingly, it greatly improves a degree of freedom in shape of the vacuum heat insulator, and it substantially increases fields of apparatuses and areas for which this vacuum heat insulator is adaptable. In addition, it can prevent leakage of heat from joint areas of the heat insulator, as has occurred in the past.

Fifth Exemplary Embodiment

Figure 7:
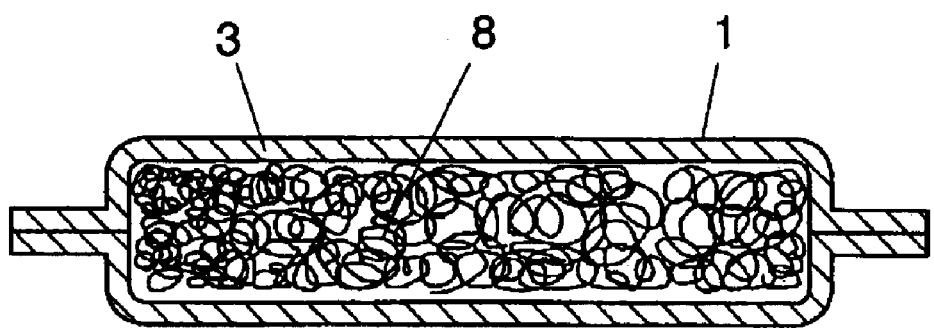
FIG. 7 is a sectional view of a vacuum heat insulator showing an example of the present invention.

FIG. 7 is a sectional view of vacuum heat insulator 1 of this exemplary embodiment, wherein inorganic fiber material 7 of which a peak of distribution in fiber diameter lies between 1 $\mu$m or smaller and 0.1 $\mu$m or larger is inserted in an enveloping member 3 having a metallized film layer and a thermoplastic polymer layer.

The vacuum heat insulator of the present exemplary embodiment is characterized by use of inorganic fibers as a core of which a peak of distribution in fiber diameter lies between 1 $\mu$m or smaller and 0.1 $\mu$m or larger, and not containing binding material for fixing the fiber material. A distinctive feature is that the inorganic fibers used here have a bulk density of 15 kg/m$^3$ or larger, but less than 100 kg/m$^3$, and the bulk density is increased by compression into 100 kg/m$^3$ or larger, but less than 300 kg/m$^3$. The inorganic fibers used in the exemplary embodiment are formed into a sheet shape, and a plurality of them are laminated for use as a core.

A method of measuring the distribution of fiber diameters of the inorganic fiber material 8 used for the vacuum heat insulator of the present exemplary embodiment was fundamentally based on JIS (Japanese Industrial Standard) A 9504 an-made Mineral Fiber Heat insulation Materials Section 4.8: Average diameter of fibers except that only an accuracy of the measurement in JIS was modified from 0.5 $\mu$m to 0.1 $\mu$m.

In this measuring method, 20 grams of sample is taken from 3 places in one test piece, 20 fibers are further collected from each of the samples, and they are measured at the accuracy of 0.1 $\mu$m by a microscope or an electron microscope.

Since the fiber diameters of the inorganic fiber material 8 lie between 1 $\mu$m or smaller and 0.1 $\mu$m or larger, an excellent heat insulation property of 10 times or greater than that of the ordinary rigid urethane foam can be observed, because of an effect of reduction in solid contact areas, which reduces solid thermal conduction, and another effect of small air spaces, which reduce gaseous thermal conduction.

The vacuum heat insulator of the present exemplary embodiment is adaptable for changing its shape because the inorganic fiber material 8 is not hound by a binding material, and moreover, it does not result in deterioration of the heat insulation property due to gases generated from binding material.

Also, it is made at low cost because it uses the inorganic fibers having the bulk density of 15 kg/m$^3$ or larger, and less than 100 kg/m$^3$, which makes the inorganic fibers tangling up all by themselves into an integrated configuration without needing a special treatment.

Further, since the inorganic fibers are compressed to become the bulk density of 100 kg/m$^3$ or larger and less than 300 kg/m$^3$ after the compression, a physical strength of the core improves, and thereby the productivity improves in the process of insertion into the enveloping member, and so on. Furthermore, a difference between the bulk density after the compression and a density of the completed vacuum heat insulator is small, distortion of the vacuum heat insulator is suppressed, thereby improving smoothness of the surfaces. A means of compressing the inorganic fibers in the bulk density of 15 kg/m$^3$ or larger and less than 100 kg/m$^3$ into 100 kg/m$^3$ or larger and less than 300 kg/M$^3$ is not specifically limited, but it may be any means such as physical compression, thermal compression, and so on, as long as it is capable of producing the high density.

Concrete examples of the embodiment will be described below.

EXAMPLE 1

Silica alumina wool having a peak of distribution of 0.8 $\mu$m in fiber diameter and 25 kg/m$^3$ in bulk density was used as a core of the vacuum heat insulator. A composition of the silica alumina wool was identical to that described in the first exemplary embodiment.

Material used as an enveloping member was a laminated film of a three-layer structure comprising a polyethylene terephthalate film/an ethylene-vinyl alcohol copolymer film provided with aluminum layer deposited/and non-oriented polypropylene. The polyethylene terephthalate film, the ethylene-vinyl alcohol copolymer, and non-oriented polypropylene serve as a surface protective layer, a gas barrier layer, and a fusion weld layer, respectively.

The core was inserted between the enveloping member, and the enveloping member was sealed at a pressure of 13.3 Pa to complete the vacuum heat insulator. Dimensions of the vacuum heat insulator were 60 cm by 30 cm by 1 cm. A thermal conductivity of this vacuum heat insulator, when measured, was 0.0023 W/mK.

Degradation of this heat insulator was evaluated by an accelerated test, but no degradation in the heat insulation property was confirmed under an aging condition equivalent to 10 years.

EXAMPLE 2

In stead of the core in Example 1, a silica alumina wool having a peak of distribution of 0.8 $\mu$m in fiber diameter was compressed into a sheet-form having a bulk density of 120 kg/m$^3$, and used as a core of the vacuum heat insulator.

A thermal conductivity of this vacuum heat insulator, when measured, was 0.0023 W/mK. Degradation of this heat insulator was evaluated by the accelerated test, but no degradation in the heat insulation property was confirmed under the aging condition equivalent to 10 years.

Moreover, as the bulk density is increased, a mechanical strength of the sheet is improved and this made it easier to insert it into the enveloping member. It is obvious according to a comparison between the first and the second examples that the compression of the core improves easiness of handling in the fabrication, while maintaining the heat insulation property.

Sixth Exemplary Embodiment

Figure 8:
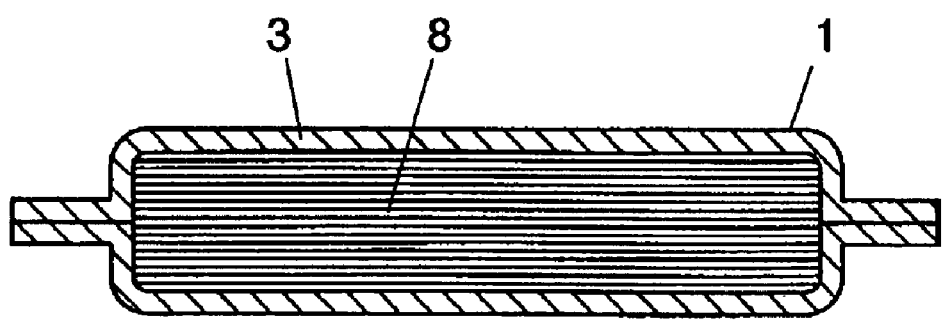
FIG. 8 is a sectional view of a vacuum heat insulator showing another example of the present invention.

FIG. 8 shows a sectional view of vacuum heat insulator of the present exemplary embodiment, in which a plurality of sheet-formed inorganic fiber materials 8 having a peak of distribution in fiber diameter between 1 μm or smaller and 0.1 μm or larger are laminated, and inserted into an enveloping member 3 having a metallized film layer and a thermoplastic polymer layer. Details will be described below according to concrete examples.

EXAMPLE 3

A silica alumina wool having a peak of distribution of 0.8 μm in fiber diameter and 25 kg/m$^3$ in bulk density is used as a core of the vacuum heat insulator instead of the core in Example 1 of the fifth exemplary embodiment after it was processed into a sheet-form, and a plurality of them laminated.

A thermal conductivity of this vacuum heat insulator, when measured, was 0.0023 W/mK. Also, degradation of this heat insulator was evaluated by the accelerated test, but no degradation in the heat insulation property was confirmed under the aging condition equivalent to 10 years.

Furthermore, insertion into the enveloping member became easier, since its hardness increased because the fibers were processed into the sheet-form and laminated.

EXAMPLE 4

A silica alumina wool having a peak of distribution of 0.6 μm in fiber diameter and 25 kg/m$^3$ in bulk density is used as a core of the vacuum heat insulator instead of the core in Example 1 of the fifth exemplary embodiment after it was processed into a sheet-form, and a plurality of them laminated.

Three sheets of the vacuum heat insulator were prepared, among which two of them were made for 30 cm by 30 cm by 1 cm. The other one was made into a plate shape measuring 60 cm by 30 cm by 1 cm, which was then bent at a center portion.

A thermal conductivity of these vacuum heat insulators, when measured, was 0.0017 W/mK. This is considered to be an effect of reduction in both solid heat conduction and gaseous heat conduction, since the peak of distribution in fiber diameter was further reduced.

Also, degradation of this heat insulator was evaluated by the accelerated test, but no degradation in the heat insulation property was confirmed under the aging condition equivalent to 10 years.

Furthermore, insertion into the enveloping member became easier, since its hardness was increased as the fiber was processed into the sheet-form and laminated.

Figure 10:
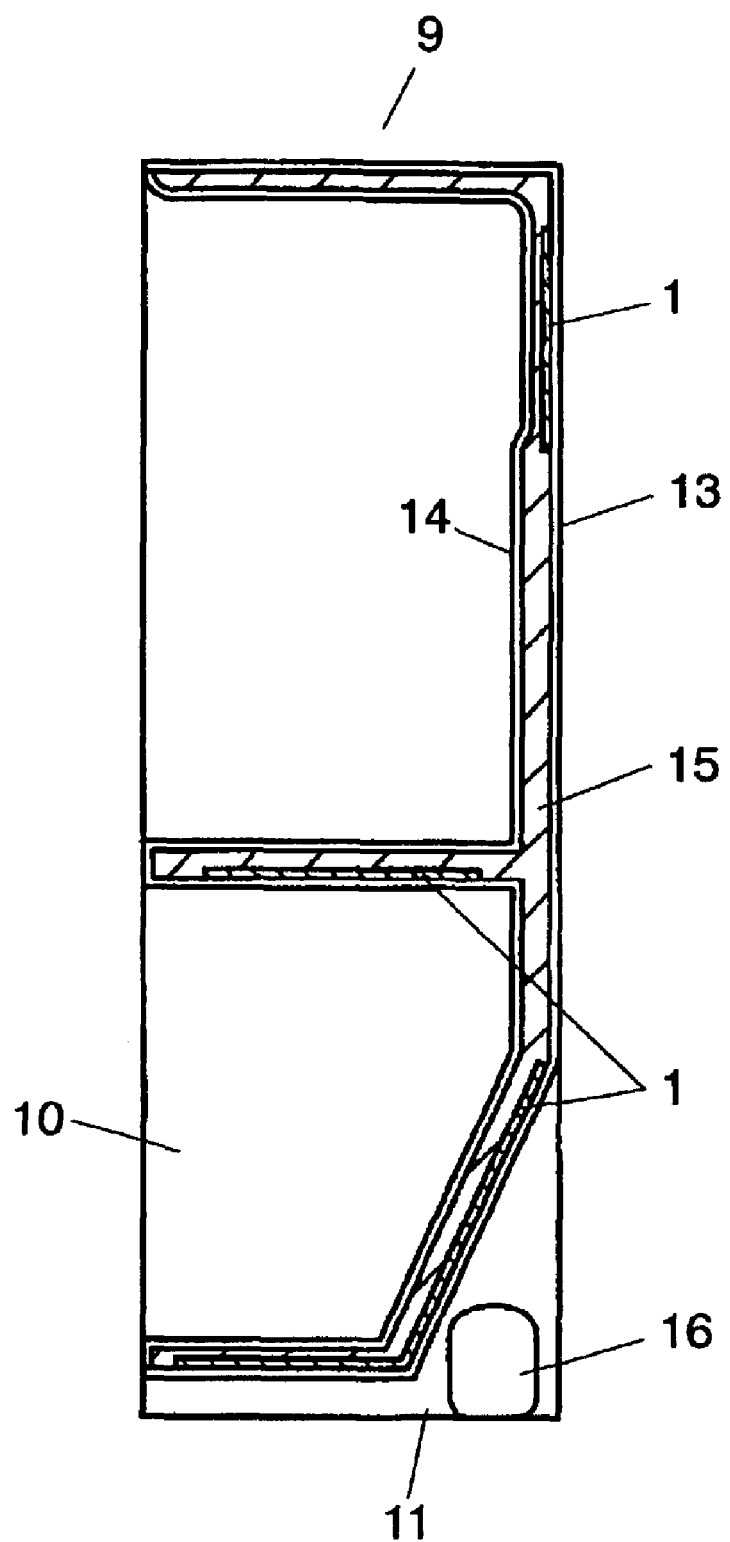
FIG. 10 is a sectional view showing a refrigerator in an exemplary embodiment of the present invention.

The three vacuum heat insulators of the present example were applied to a refrigerator as shown in FIG. 10. The two having a plate shape were embedded in a back surface and a barrier wall in the storage space, and the bent one in a bottom surface. When electric power consumption was measured, it showed a 12% reduction as compared to a one not employing any heat insulator, thereby the effect of heat insulation was confirmed. In addition, degradation of these heat insulators was evaluated by the accelerated test, but no degradation in the heat insulation property was confirmed under the aging condition equivalent to 10 years.

EXAMPLE 5

The same core and enveloping member of the vacuum heat insulator in Example 4 were used. The enveloping member was filled with the core, and was sealed at a pressure of 13.3 Pa to complete a vacuum heat insulator. Dimensions of the vacuum heat insulator were 12 cm by 12 cm by 1 cm. A thermal conductivity of this vacuum heat insulator, when measured, was 0.0017 W/mK.

EXAMPLE 6

The same core and enveloping member of the vacuum heat insulator in Example 4 were used. The enveloping member was filled with the core, and was sealed at a pressure of 13.3 Pa to complete a vacuum heat insulator. The vacuum heat insulator was made in the size of 60 cm by 15 cm by 7 mm, and fabricated into a cylindrical shape. A thermal conductivity of this vacuum insulator, when measured, was 0.0017 W/mK.

Figure 12:
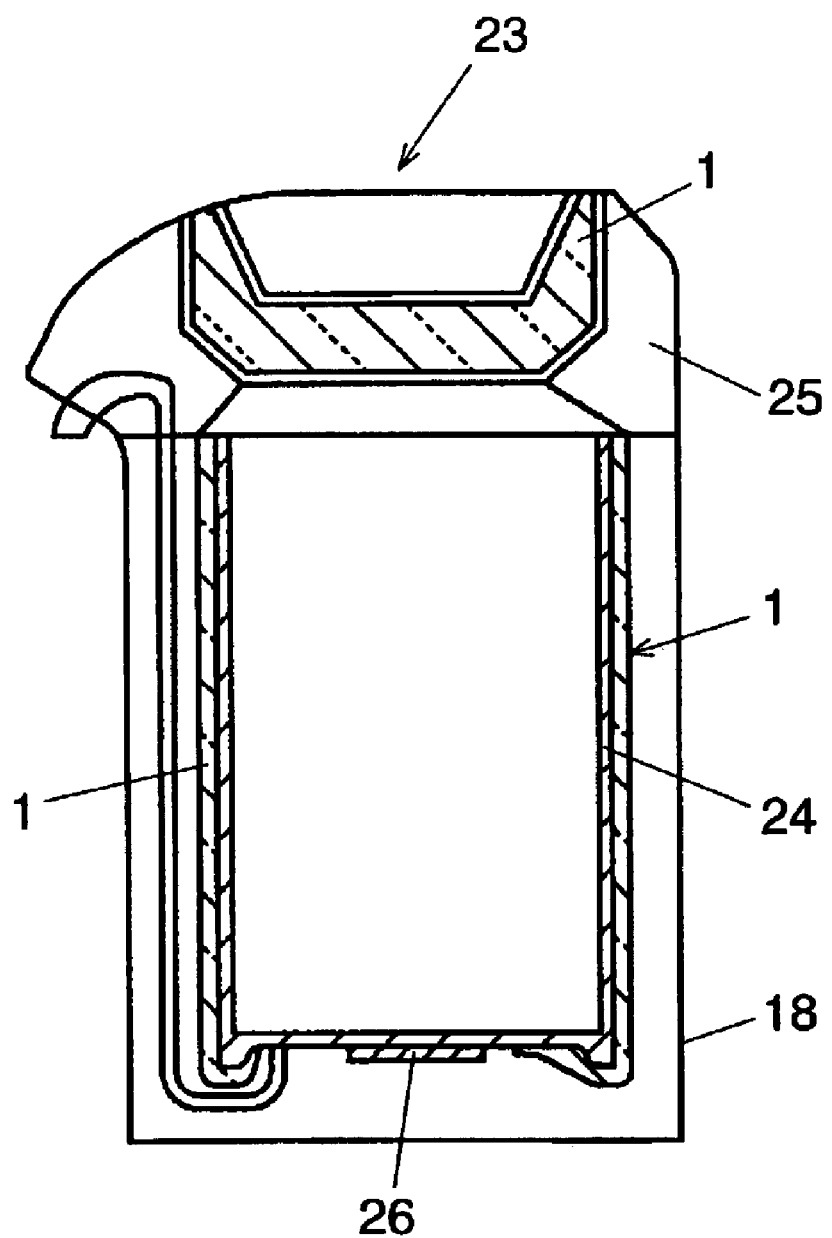
FIG. 12 is a sectional view showing a water heater in an exemplary embodiment of the present invention.

The vacuum heat insulator of the present example was applied to an electric water heater as shown in FIG. 12. When electric power consumption was measured, an effect of the heat insulation was confirmed as it showed a 40% reduction as compared to one that uses the ordinary insulating material. In addition, degradation of this heat insulator was evaluated by the accelerated test, but no degradation in the heat insulation property was confirmed under the aging condition equivalent to 10 years.

EXAMPLE 7

The same core and enveloping member of the vacuum heat insulator in Example 4 were used. The enveloping member was filled with the core, and sealed at a pressure of 13.3 Pa. Two sheets of the vacuum heat insulator were fabricated. One of the vacuum heat insulators was made in the size of 20 cm by 20 cm by 7 mm. Another one was formed into a shape that fits to a lid portion of the electric water heater. When a thermal conductivity of these vacuum heat insulators was measured, it was 0.0017 W/mK.

Seventh Exemplary Embodiment

Figure 9:
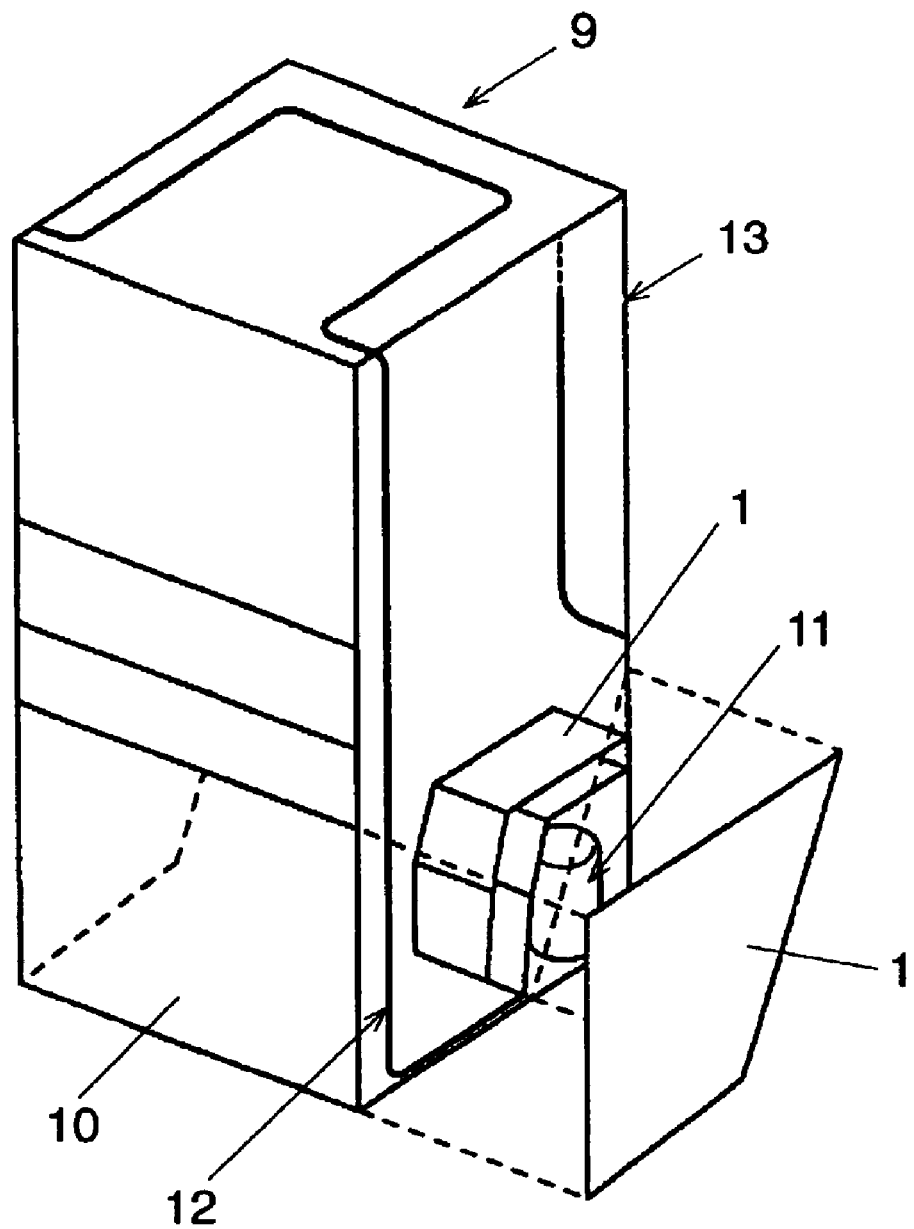
FIG. 9 is an isometric view showing a refrigerator in an exemplary embodiment of the present invention.

FIG. 9 is an perspective view showing a refrigerator 9 of the present exemplary embodiment.

The refrigerator 9 is provided with a freezer compartment 10 in a lower section and a machine room 11 in a lower rear section, and a refrigerant piping 12 is attached to an outer casing 13 with aluminum tape. A space between an inner cabinet (not shown in the figure) and the outer casing 13 is filled with rigid urethane foam (not shown in the figure) using cyclopentane as a blowing agent. Vacuum heat insulator 1 of the present invention is disposed on each of the sidewalls of the freezer compartment 10. The high-temperature refrigerant piping 12 is placed between the vacuum heat insulators 1 on the sidewalls of the freezer compartment and the outer casing 13 whereon the heat insulators are adhered. Also, the vacuum heat insulators 1 are formed into such shapes that generally cover the sidewalls of the freezer compartment.

Therefore, the refrigerator of low power consumption is provided, since the sidewalls of the freezer compartment are efficiently thermally insulated, and heat of the high-temperature refrigerant piping is prevented from transferring into the freezer compartment. In addition, a degradation of the heat insulation property due to a liquefaction of the urethane blowing agent (cyclopentane) that occur when it is refrigerated to −18° C. can be also prevented.

In addition, the refrigerator 9 of the present invention is also provided with another vacuum heat insulator 1 between the machine room 11 and the freezer compartment 10. An installation of the vacuum heat insulator 1 in the above position improves efficiency of the refrigerator 9, and thereby realizing the refrigerator of even lower power consumption, since the machine room 11 has a highest temperature by an operation of a compressor.

Because the vacuum heat insulator 1 of the present invention has flexibility, it can be laid along a stereoscopic shape of the machine room. Also, because the vacuum heat insulator 1 of the present invention has a heat-resistant property, it can be used in the space between the machine room 11 and the freezer compartment 10 at a side nearer to the machine room 11, which can thus provide the refrigerator with outstanding energy saving and cost performance.

Furthermore, the vacuum heat insulator of the present invention is superior in recycling, because the core is easily separable when the refrigerator is disposed, and it can be used repeatedly.

Eighth Exemplary Embodiment

FIG. 10 is a sectional view of a refrigerator 9 of an exemplary embodiment of the present invention.

The refrigerator 9 is characterized by a structure wherein vacuum heat insulators 1 described in the fifth exemplary embodiment are disposed beforehand in a cavity constructed of an inner cabinet 14 and an outer casing 13, and spaces not occupied by the vacuum heat insulators are filled by a rigid urethane foam 15. There is also another vacuum heat insulator 1 bent along a configuration of the outer casing, and disposed between a vicinity of a compressor 16 in a machine room 11 and a freezer compartment 10 located underneath the refrigerator compartment.

The heat insulator of the present invention can be bent and curved because it is not bound by any binding material. This makes the vacuum heat insulator applicable to such an area that was otherwise difficult to apply in the past, and it can therefore contribute further to the energy saving. In addition, since it does not result in deterioration of heat insulation property due to an increase in an internal pressure of gases generated from the binding material, it can contribute to the energy saving continuously without deterioration of the heat insulation property for an extended period of time.

The heat insulator of this invention is also applicable for other refrigeration apparatuses such as commercial refrigerators, showcases, freezers, refrigerators, and the like. The refrigerators and the refrigeration apparatuses of the present invention include those products that use hot and cold heat in a range that covers −30° C. to the ordinary temperature representing an operating temperature range for the above products, as well as higher temperatures for vending machines. Besides, the apparatus is not limited only to the electric apparatuses, but it also includes gas-fired apparatuses, and the like.

Ninth Exemplary Embodiment

Figure 11:
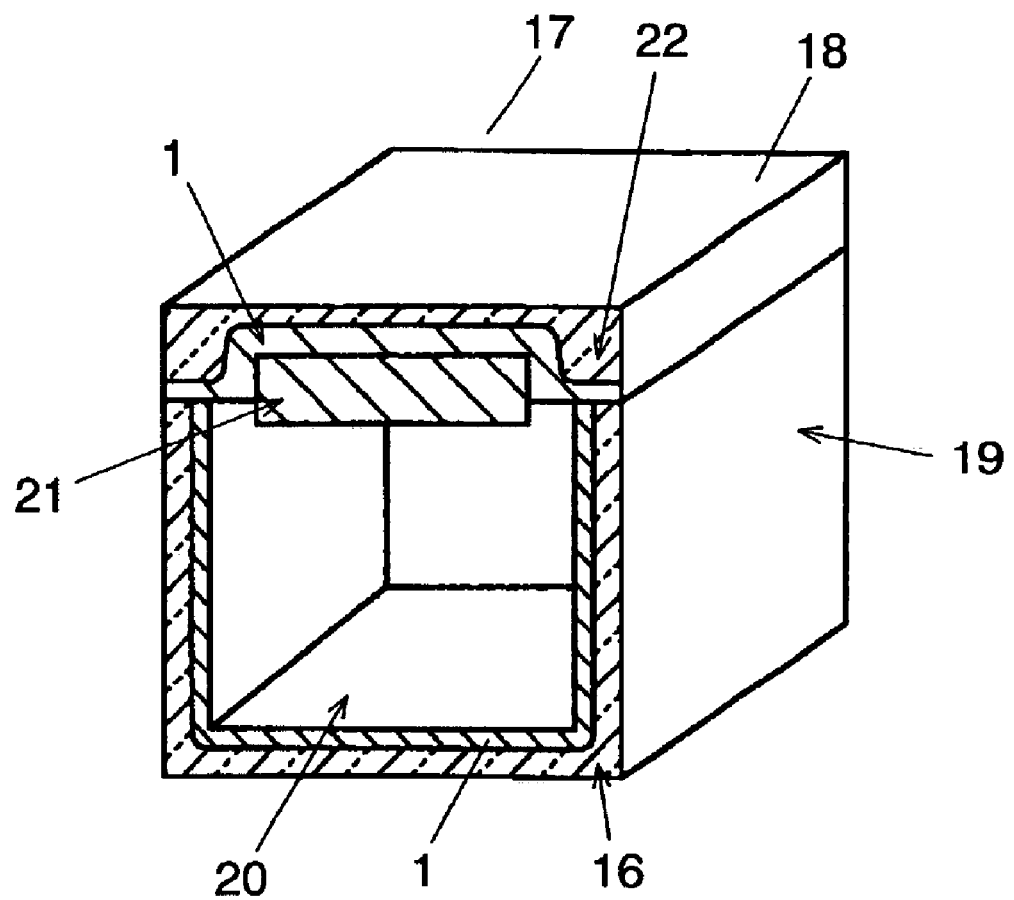
FIG. 11 is a sectional view showing a hot/cold preserving box in an exemplary embodiment of the present invention.

FIG. 11 is a sectional view of a hot/cold preserving box in one exemplary embodiment of the present invention.

The hot/cold preserving box 17 comprises a lid 18, an outer casing 19, an inner cabinet 20, a cold storage unit 21, a heat insulator 22, and vacuum heat insulator 1.

Since the vacuum heat insulator 1 of the present invention has flexibility, it can be attached integrally to the hot/cold preserving box 17 of a generally cubic configuration, if it is bent beforehand when applying it to the hot/cold preserving box. This structure can reduce joint areas of the vacuum heat insulator 1, and therefore reduce a leakage of heat from the joint areas.

Even if a recess is formed in the lid 18 for installation of the cold storage unit 21, the vacuum heat insulator 1 of this invention can be installed in the recess, because it has flexibility, and thereby the heat insulation of the hot/cold preserving box 17 can be enhanced efficiently.

The hot/cold preserving box 17 of the above structure has a heat insulation property that was not available in the past, as it can make full use of the vacuum heat insulator 1. Accordingly, it is useful as a cold storage box for medical purposes, which requires more stringent temperature control, in addition to the ordinary icebox for outing.

The material for the cold storage unit 21 is not limited, but any of commercially available cold storage agents are usable. In addition, the heat insulator 22 is also not specifically limited. Fibrous materials such as glass wool and glass fiber are useable, in addition to commercially available foam insulation materials such as rigid polyurethane foam, polystyrene foam, and so on.

Furthermore, the hot/cold preserving box 17 can be used as a hot storage box when a heat storage unit is used in place of the cold storage unit 21.

The vacuum heat insulator 1 can be attached to either one of the outer casing 19 and the inner cabinet 20 to achieve the same effect.

Tenth Exemplary Embodiment

FIG. 12 is a sectional view depicting a water heater in one exemplary embodiment of the present invention. The water heater 23 comprises a hot-water reservoir 24, a lid 25, a heater 26, and vacuum heat insulator 1. The vacuum heat insulator 1 is installed in a manner to wrap around an outer surface of the hot-water reservoir 24, and to fold back to the vicinity of the heater 26. In addition, another vacuum heat insulator 1 is provided in a recess of the lid 25.

The water heater constructed as described above shows a very little thermal degradation, since the vacuum heat insulator 1 incorporates heat resistant inorganic fiber material as a core, and the water heater do not shows a problem even after a long time of use. Further, because the vacuum heat insulator 1 has flexibility, it can be used by folding it toward the vicinity of the heater, and is also applicable to the irregularly recessed portion in the lid.

The water heater 23 does not only reduce power consumption, but also can be made compact, because the vacuum heat insulator 1 has outstanding heat insulation property as well as heat resistance and flexibility.

Eleventh Exemplary Embodiment

Figure 13:
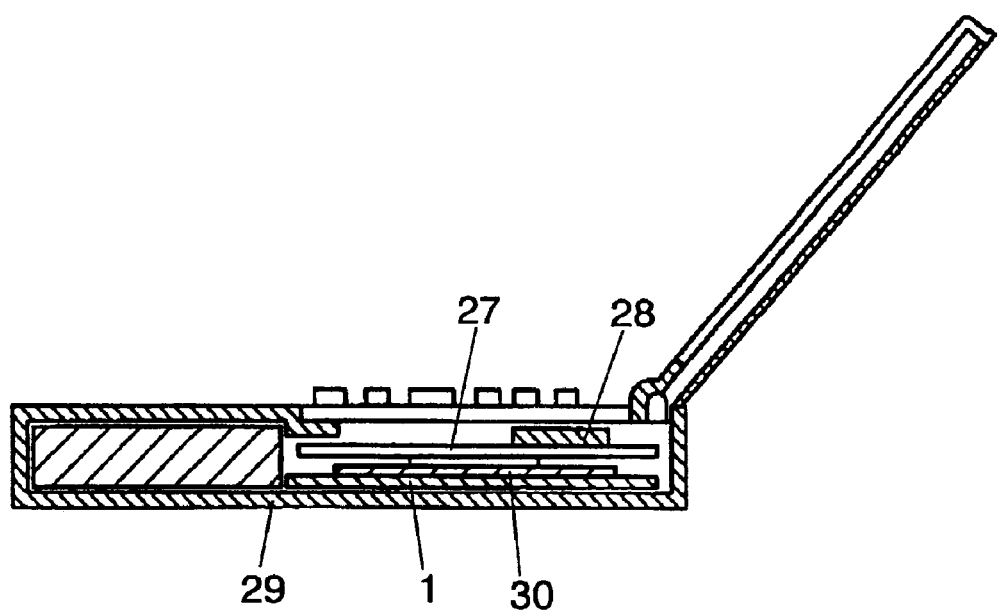
FIG. 13 is a sectional view of a notebook-type computer in an exemplary embodiment of the present invention.

FIG. 13 is a sectional view of a notebook type computer of the present invention.

The notebook type computer of this invention is characterized by having vacuum heat insulator 1 described in Example 5 in a position between a heat-generating component 28 on a main board 27 and a bottom portion of a casing 29, and a heat radiation plate 30.

The vacuum heat insulator of Example 5 was placed in the notebook type computer as shown in FIG. 13, and a temperature of the bottom surface was measured. An effect of the heat insulation was confirmed since it showed a decrease of 5° C. as compared to the one that does not use a vacuum heat insulator. In addition, degradation of the heat insulator was evaluated by the accelerated test, but no degradation in the heat insulation property was confirmed under the aging condition equivalent to 10 years.

The notebook type computer constructed as above achieves high heat insulation since the vacuum heat insulator shows an excellent heat insulation property of 10 times or greater than that of the ordinary rigid urethane foam, and thereby the heat transferred to the surface from an interior of the device does not give an uncomfortable feeling to the user.

There can be a risk of thermal-runaway of the device if the insulation is merely placed for the heating component. However, the notebook type computer of this invention can prevent the heat-generating component 28 from going into a thermal-runaway, because it is additionally provided with the radiation plate 30, which can efficiently dissipate heat from the heat-generating component 28.

Although what has been described above is an example, in which the heat insulator of the present invention is used for the notebook type computer, electronic apparatuses which can use the heat insulator of the present invention are not limited only to the notebook type computer. That is, the heat insulator of the present invention functions effectively for any apparatuses so long as they require heat insulation in a range of operating temperatures from the ordinary temperature to around 80° C.

Twelfth Exemplary Embodiment

Figure 14:
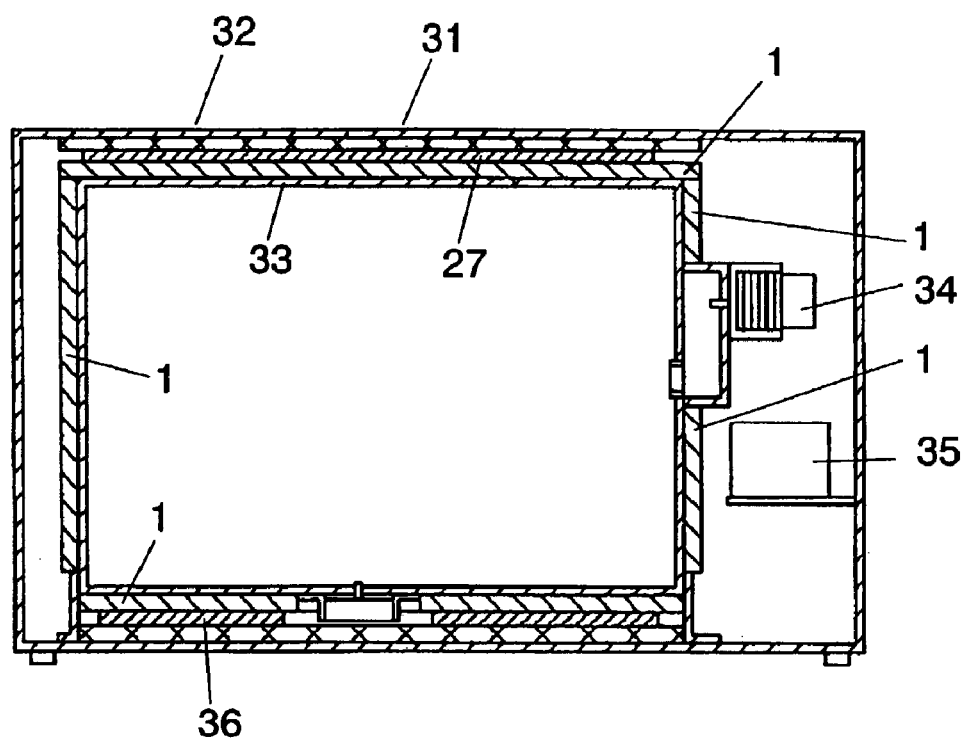
FIG. 14 is a sectional view of an oven-range in an exemplary embodiment of the present invention.

FIG. 14 is a sectional view of a microwave oven 31 of the present invention. The microwave oven 31 is characterized by having an outer casing 32, an oven wall 33, a dielectric heating means 34, a power converter 35, a high-frequency magnetic field generation means 36, and vacuum heat insulator 1 described in the sixth exemplary embodiment.

The vacuum heat insulator of Example 7 was applied to a microwave oven as shown in FIG. 14, and electric power consumption was measured. An effect of the heat insulation was confirmed since it showed a 57% reduction as compared to the one that uses no heat insulator. In addition, degradation of the heat insulator was evaluated by the accelerated test, but no degradation in the heat insulation property was confirmed under the aging condition equivalent to 10 years.

The microwave oven of the present invention is taken as a representative of such apparatuses that require heat insulation in a range of operating temperatures from the ordinary temperature to about 250° C. The vacuum heat insulator of this invention is also useful in a similar manner for toasters, home bakeries, and the like apparatuses for example.

Moreover, application of the vacuum heat insulator of the present invention is not limited to electric apparatuses, but it is also applicable for heat insulation of gas-fired apparatuses, automobiles, houses, and so forth.

Comparative examples described hereinafter were used to verify the effect of the above heat insulator of the present invention.

COMPARATIVE EXAMPLE 1

Silica alumina wool having a peak of distribution of 7 μm in fiber diameter and 25 kg/m³ in bulk density was used as a core of a vacuum heat insulator. An enveloping member used comprises a surface protective layer of polyethylene terephthalate film, a gas barrier layer of ethylene-vinyl alcohol copolymer film provided with aluminum deposition layer, and a fusion layer of non-oriented polypropylene. The enveloping member was filled with the core, and it was sealed at a pressure of 13.3 Pa to complete the vacuum heat insulator. Dimensions of the vacuum heat insulator were set for 30 cm by 30 cm by 1 cm.

A heat conductivity of this vacuum heat insulator, when measured, was 0.0062 W/mK. This value is approximately 2.7 times greater than the value when fiber diameter of 0.8 μm in the peak of distribution is used. This is because of an increase in solid contact areas due to an increase in diameter of the fibers, which promotes solid heat conduction, and an increase in gaseous heat conduction due to an increase in diameter of air spaces.

COMPARATIVE EXAMPLE 2

A silica alumina wool having a peak of distribution of 7 μm in fiber diameter and 25 kg/m³ in bulk density was used in stead of the core of the vacuum heat insulator in Comparative example 1 after it was processed into a sheet-form, and a plurality of them laminated.

A thermal conductivity of this vacuum heat insulator was measured, which was 0.0062 W/mK. This value is approximately 2.7 times greater than the value when fiber diameter of 0.8 μm in the peak of distribution is used. This is because of an increase in solid contact areas due to an increase in diameter of the fibers, which promotes solid heat conduction, and an increase in gaseous heat conduction due to an increase in diameter of air spaces.

The vacuum heat insulator of the present comparative example was applied to three locations in FIG. 10 where bending process is not required. When electric power consumption was measured, it was only lower by 5% than the blank, showing a lower effect of reduction by 7% in power consumption as compared to that of the Example 4.

COMPARATIVE EXAMPLE 3

A silica alumina wool having a peak of distribution of 0.8 μm in fiber diameter and 25 kg/m³ in bulk density was used as a core of the vacuum heat insulator in stead of the core in Comparative example 1 after it was bound with acrylic binder.

A heat conductivity of this vacuum heat insulator was measured, and it was 0.0031 W/mK. This value is greater by 8 points than the value found when the fibers of 0.8 μm in the peak of the diameter distribution and not using binding material was applied. This is considered to be derived from the solid heat conduction increased due to an adhesion by the binding material at contact points of the fibers.

In addition, it was confirmed that gases were generated with the passage of time because it used the organic binding material. Degradation of the heat insulator was evaluated by the accelerated test, and degradation in the heat insulation property was confirmed under the aging condition equivalent to one year.

The vacuum heat insulator of the present comparative example was applied to the three locations in FIG. 10, and electric power consumption of the refrigerator was measured. It was lower by 9% than the one using no insulation material, showing it is 3% less efficient than that of Example 4.

COMPARATIVE EXAMPLE 4

The silica alumina wool having a peak of distribution of 0.8 μm in fiber diameter and 25 kg/m³ in bulk density was used as a core of the vacuum heat insulator in stead of the core in Comparative example 1. The fibers were gathered, subjected to a wetting treatment with acid solution, dried by compression dehydration, and the fibers were bound together by concentrating and hardening eluted component of the inorganic fibers at intersecting points of the fibers.

When thermal conductivity of this vacuum heat insulator was measured, it was 0.0023 W/mK, which is equivalent to the above Example 1.

However, the heat insulator of this comparative example was adaptable only for the limited applications in a planer configuration because it has no flexibility and unable to make any changes in shape such as bending and cylindrical forming.

COMPARATIVE EXAMPLE 5

A core and an enveloping member of the vacuum heat insulator used are same as those of Comparative example 2.

The enveloping member was filled with the core, and it was sealed at a pressure of 13.3 Pa to complete the vacuum heat insulator. Dimensions of the vacuum heat insulator were set for 12 cm by 12 cm by 1 cm.

COMPARATIVE EXAMPLE 6

A core and an enveloping member of the vacuum heat insulator used are same as those of Comparative example 3. The enveloping member was filled with the core, and it was sealed at a pressure of 13.3 Pa to complete the vacuum heat insulator. Dimensions of the vacuum heat insulator were set for 12 cm by 12 cm by 1 cm.

The vacuum heat insulator of this comparative example was placed in a notebook type computer as shown in FIG. 13, and a temperature of the bottom surface was measured. An effect of the heat insulation was lower than the eleventh exemplary embodiment, since it showed a decrease of 2° C. as compared to the one that uses no insulation material.

COMPARATIVE EXAMPLE 7

A core and an enveloping member of the vacuum heat insulator used are same as those of Comparative example 2. The enveloping member was filled with the core, and it was sealed at a pressure of 13.3 Pa to complete the vacuum heat insulator. Dimensions of the vacuum heat insulator were set for 60 cm by 15 cm by 7 mm.

The vacuum heat insulator of this comparative example was placed in a notebook type computer as shown in FIG. 13, and a temperature of the bottom surface was measured. An effect of the heat insulation was lower than the eleventh exemplary embodiment, since it showed a decrease of 4° C. as compared to the one that uses no insulation material. In addition, degradation of the heat insulator was observed by the accelerated test, and degradation in the heat insulation property was confirmed under the aging condition equivalent to one year.

COMPARATIVE EXAMPLE 8

A core and an enveloping member of the vacuum heat insulator used are same as those of Comparative example 3. The enveloping member was filled with the core, and it was sealed at a pressure of 13.3 Pa to complete the vacuum heat insulator. Dimensions of the vacuum heat insulator were set for 60 cm by 15 cm by 7 mm.

The vacuum heat insulator of this comparative example was placed in an electric water heater as shown in FIG. 12, and power consumption was measured. An effect of reducing power consumption was lower by approx. 20% than the tenth exemplary embodiment, as it showed a decrease of 20% as compared to the one that uses no insulation material.

COMPARATIVE EXAMPLE 9

A core and an enveloping member of the vacuum heat insulator used are same as those of Comparative example 2. The enveloping member was filled with the core, and it was sealed at a pressure of 13.3 Pa to complete the vacuum heat insulator. Dimensions of the vacuum heat insulator were set for 20 cm by 20 cm by 7 mm.

The vacuum heat insulator of this Comparative example 9 was placed in an electric water heater as shown in FIG. 12, and power consumption was measured. An effect of reducing power consumption was lower by approximately 5% than the tenth exemplary embodiment, as it showed a decrease of 35% as compared to the one that uses no insulation material. In addition, degradation of the heat insulator was observed by the accelerated test, and degradation in the heat insulation property was confirmed under the aging condition equivalent to one year.

COMPARATIVE EXAMPLE 10

A core and an enveloping member of the vacuum heat insulator used are same as those of Comparative example 3. The enveloping member was filled with the core, and it was sealed at a pressure of 13.3 Pa to complete the vacuum heat insulator. Dimensions of the vacuum heat insulator were set for 20 cm by 20 cm by 7 mm.

The vacuum heat insulator of this comparative example was placed in an microwave oven as shown in FIG. 14, and power consumption was measured. An effect of heat insulation was lower by approximately 37% than the twelfth exemplary embodiment, as it showed a decrease in power consumption of 20% as compared to the one that uses no insulation material.

COMPARATIVE EXAMPLE 11

The vacuum heat insulator of Comparative example 2 was applied to an microwave oven as shown in FIG. 14, and power consumption was measured. An effect of heat insulation was lower by approximately 7% than the twelfth exemplary embodiment, as it showed a decrease in power consumption of 50% as compared to the one that uses no insulation material. In addition, degradation of the heat insulator was observed by the accelerated test, and degradation in the heat insulation property was confirmed under the aging condition equivalent to one year.

INDUSTRIAL APPLICABILITY

According to the present invention as described above, a highly efficient vacuum heat insulator, which holds an outstanding heat insulation property of ten times or greater than that of the ordinary rigid urethane foam is provided. It is easy to change in shape, and is not degrade in the heat insulation property. Furthermore, by employing the efficient vacuum heat insulator of the present invention, electronic and electric apparatuses that are superior in energy saving and are not present an uncomfortable feeling to the user can be provided.

What is claimed is:

1. A vacuum heat insulator comprising:
    a laminated core comprising a plurality of sheet-formed inorganic fibers;
    an enveloping member; and
    an absorbent,
    wherein said inorganic fibers include 50–65 wt % of $SiO_2$, 10–20 wt % of $Al_2O_3$, 10–20 wt % of CaO, and 1–4 wt % of MgO, a fiber diameter of said inorganic fibers is 1 $\mu$m or larger and 5 $\mu$m or smaller, and a bulk density of said inorganic fibers is 100 Kg/m$^3$ or more and 300 Kg/M$^3$ or less.

2. The vacuum heat insulator according to claim 1, wherein said sheet-formed inorganic fibers are provided with a cut-off portion formed therein, except for an uppermost sheet and a lowermost sheet, and said absorbent is disposed in said cut-off portion.

3. The vacuum heat insulator according to claim 1 further comprising at least one groove formed therein.

4. The vacuum heat insulator according to claim 3, wherein said groove is formed symmetrically with respect to a centerline of said vacuum heat insulator.

5. The vacuum heat insulator according to claim 4, wherein said vacuum heat insulator is bent along said groove.

6. The vacuum heat insulator according to claim 4, wherein a thickness of said core in an area of said groove is one-half or less than a thickness in other areas of said core.

7. The vacuum heat insulator according to claim 4, wherein one face of said enveloping member comprises a laminate film with a metal foil laminated on a plastic film, and another face of said enveloping member comprises of a plastic film with deposited metal or deposited metal oxide, and said vacuum heat insulator is bent in a manner that said face comprising the deposited plastic film face to an outside.

8. The vacuum heat insulator according to claim 3, wherein said vacuum heat insulator is bent along said groove.

9. The vacuum heat insulator according to claim 3, wherein a thickness of said core in an area of said groove is one-half or less than a thickness in other areas of said core.

10. The vacuum heat insulator according to claim 3, wherein one face of said enveloping member comprises a laminate film with a metal foil laminated on a plastic film, and another face of said enveloping member comprises of a plastic film with deposited metal or deposited metal oxide, and said vacuum heat insulator is bent in a manner that said face comprising the deposited plastic film face to an outside.

11. A vacuum heat insulator comprising:
    inorganic fibers, said inorganic fibers including $SiO_2$ as a main component, $Al_2O_3$, CaO, and MgO, a fiber diameter of said inorganic fibers having a peak value of distribution of 1 $\mu$m or smaller and 0.1 $\mu$m or larger;
    an enveloping member; and
    an absorbent,
    wherein a bulk density of said inorganic fibers is 15 $Kg/m^3$ or more and 100 $Kg/m^3$ or less, and a bulk density of said inorganic fibers after an compression is 100 $Kg/m^3$ or more and 300 $Kg/m^3$ or less.

12. The vacuum heat insulator according to claim 11, wherein said inorganic fibers include 50–65 wt % of $SiO_2$, 10–20 wt % of $Al_2O_3$, 10–20 wt % of CaO, and 1–4 wt % of MgO.

13. The vacuum heat insulator according to claim 11, wherein said inorganic fibers are formed into a sheet-form, and a plurality of said sheet-form inorganic fibers are laminated.

14. A hot/cold preserving apparatus using vacuum heat insulator for heat insulation, said vacuum heat insulator comprising:
    a laminated core comprising a plurality of sheet-formed inorganic fibers;
    an enveloping member; and
    an absorbent,
    wherein said inorganic fibers include 50–65 wt % of $SiO_2$, 10–20 wt % of $Al_2O_3$, 10–20 wt % of CaO, and 1–4 wt % of MgO, a fiber diameter of said inorganic fibers is 1 $\mu$m or larger and 5 $\mu$m or smaller, and a bulk density is 100 $Kg/m^3$ or more and 300 $Kg/m^3$ or less.

15. The hot/cold preserving apparatus according to claim 14, wherein said hot/cold preserving apparatus comprises a hot/cold preserving box comprising:
    an outer casing;
    an inner cabinet;
    a lid; and
    a said vacuum heat insulator disposed between said outer casing and said inner cabinet.

16. The hot/cold preserving apparatus according to claim 15, wherein said hot/cold preserving apparatus comprises a hot/cold preserving box having a recess in an inside of a cover containing a hollow space, wherein said recess is provided with one of a cold storage unit and a heat storage unit, and said vacuum heat insulator is disposed at a recess side of said hollow space in a manner that said vacuum heat insulator covers along said recess.

17. The hot/cold preserving apparatus according to claim 14 wherein said hot/cold preserving apparatus comprises a water heater comprising:
    a hot-water reservoir;
    an outer casing;
    a lid;
    a heater; and
    said vacuum heat insulator.

18. The hot/cold preserving apparatus according to claim 17, wherein said vacuum heat insulator is disposed in a space in said lid, and said vacuum heat insulator is formed in a shape substantially a same shape of a lower portion of said lid.

19. An electric apparatus including a vacuum heat insulator, said vacuum heat insulator comprising:
    a core comprising inorganic fibers including a main component of $SiO_2$ and having a peak value of distribution in fiber diameter of 1 $\mu$m or smaller and 0.1 $\mu$m or larger, a bulk density of said inorganic fibers being 15 $Kg/m^3$ or more and 100 $Kg/m^3$ or less, and a bulk density of said inorganic fibers after an compression being 100 $Kg/m^3$ or more and 300 $Kg/m^3$ or less, and said core not containing a binding material for fixing fiber material;
    an absorbent; and
    an enveloping member.

20. The electric apparatus according to claim 19, wherein said inorganic fibers include 50–65 wt % of $SiO_2$, 10–20 wt % of $Al_2O_3$, 10–20 wt % of CaO, and 1–4 wt % of MgO.

21. The electric apparatus according to claim 20, wherein said electric apparatus is any one selected a group consisting of refrigerator, vending machine, electric water heater, microwave oven, and notebook type computer.

22. The electric apparatus according to claim 19, wherein said core comprises a plurality of laminated sheet of said inorganic fibers formed into a sheet form.

23. The electric apparatus according to claim 22, wherein said electric apparatus is any one selected a group consisting of refrigerator, vending machine, electric water heater, microwave oven, and notebook type computer.

24. The electric apparatus according to claim 19, wherein said electric apparatus is any one selected a group consisting of refrigerator, vending machine, electric water heater, microwave oven, and notebook type computer.

* * * * *